United States Patent
Baita et al.

(10) Patent No.: US 10,556,972 B2
(45) Date of Patent: Feb. 11, 2020

(54) PROCESS FOR THE POLYMERIZATION OF OLEFINS

(71) Applicant: BASELL POLIOLEFINE ITALIA S.R.L., Milan (IT)

(72) Inventors: Pietro Baita, Ferrara (IT); Massimo Covezzi, Ferrara (IT); Maria Di Diego, Ferrara (IT); Lorella Marturano, Ferrara (IT); Antonio Mazzucco, Ferrara (IT); Gabriele Mei, Ferrara (IT); Roberta Pica, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/347,124

(22) PCT Filed: Nov. 2, 2017

(86) PCT No.: PCT/EP2017/078033
§ 371 (c)(1),
(2) Date: May 11, 2018

(87) PCT Pub. No.: WO2018/083161
PCT Pub. Date: May 11, 2018

(65) Prior Publication Data
US 2019/0276566 A1 Sep. 12, 2019

(30) Foreign Application Priority Data
Nov. 4, 2016 (EP) ...................... 16197310

(51) Int. Cl.
*C08F 110/02* (2006.01)
*C08F 210/02* (2006.01)
*C08F 2/34* (2006.01)
*C08F 10/02* (2006.01)

(52) U.S. Cl.
CPC ............ *C08F 10/02* (2013.01); *C08F 110/02* (2013.01); *C08F 2400/02* (2013.01)

(58) Field of Classification Search
CPC .................................. C08F 2/34; C08F 210/02
See application file for complete search history.

(56) References Cited

U.S. PATENT DOCUMENTS

| 4,368,304 A * | 1/1983 | Sato ........................ C08F 10/00 526/114 |
| 6,455,642 B1 | 9/2002 | Myhre et al. |
| 7,405,260 B2 * | 7/2008 | Mei .......................... B01J 8/228 526/65 |
| 8,216,957 B2 * | 7/2012 | Leinonen ................ C08F 10/00 502/103 |
| 2007/0093621 A1 * | 4/2007 | Meier .................... B01J 8/0055 526/65 |

FOREIGN PATENT DOCUMENTS

WO 2009/156355 A1 12/2009
WO 2015/135903 A1 9/2015

OTHER PUBLICATIONS

International Search Report and Written Opinon dated Mar. 2, 2018 (Mar. 2, 2018) for Corresponding PCT/EP2017/078033.

* cited by examiner

Primary Examiner — Rip A Lee

(57) ABSTRACT

A gas-phase process for the homopolymerization or copolymerization of olefins carried out in the presence of a catalyst system formed by a contacting, in a liquid hydrocarbon and in the presence of hydrogen, (a) a solid catalyst component comprising Ti, Mg, and Cl, and optionally an internal electron donor compound, (b) an aluminum alkyl compound and optionally (c) an external donor compound.

14 Claims, No Drawings

PROCESS FOR THE POLYMERIZATION OF OLEFINS

This application is the U.S. National Phase of PCT International Application PCT/EP2017/078033, filed Nov. 2, 2017, claiming benefit of priority to European Patent Application No. 16197310.2, filed Nov. 4, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a gas-phase process for the polymerization of olefins carried out in the presence of a catalyst system made from or containing (a) a solid catalyst component made from or containing Ti, Mg, halogen and optionally an electron donor, and (b) an aluminum alkyl compound which are brought in contact with a sequence of steps.

BACKGROUND OF THE INVENTION

Gas-phase polymerization for the preparation of polyethylene can be carried out in a fluidized, or stirred, bed reactor in the presence of a catalyst, ethylene, fluidization gas and molecular weight regulator. In some instances, Ziegler-Natta catalysts are used.

For a given catalyst system, catalyst activity may depend on the polymerization conditions such as temperature and pressure. However, once the polymerization conditions are fixed, the activity depends on the catalyst system. When the activity is not satisfactory, the amount of catalyst fed to the reactor is increased or its residence time made longer.

SUMMARY OF THE INVENTION

In a general embodiment, the present disclosure provides a gas-phase process for the homopolymerization or copolymerization of olefins including the following steps:

1) contacting, in a liquid hydrocarbon and in the absence of olefins, (a) a solid catalyst component made from or containing Ti, Mg, and Cl, and optionally an internal electron donor compound, (b) an aluminum alkyl compound and optionally (c) an external donor compound; and 2) feeding the product of the contacting step 1) to a gas-phase polymerization reactor under polymerization conditions, the process being characterized by the contacting step 1) is carried out in the presence of $H_2$ in an amount ranging from 0.1 to 8 g per Kg of solid catalyst component (a).

DETAILED DESCRIPTION OF THE INVENTION

In some embodiments, the amount of $H_2$ ranges between 0.2 to 6 g, alternatively from 0.3 to 5 g, per Kg of solid catalyst component (a).

In some embodiments, the contacting of components (a)-(b), optionally (c), and hydrogen is carried out for a period of time ranging from 10 to 120 minutes, alternatively in the range from 20 to 60 minutes, alternatively from 30 to 50 minutes. In some embodiments, the temperature ranges from 20 to 65° C., alternatively from 30 to 60° C., alternatively ranges from 45-55° C. In some embodiments, the liquid hydrocarbon is aliphatic or aromatic. In some embodiments, the liquid hydrocarbon is aliphatic saturated hydrocarbons having from 3 to 10 carbon atoms more, alternatively from 3 to 6 carbon atoms. In some embodiments, the liquid hydrocarbon is selected from the group consisting of propane, pentane and hexane.

Several ways of contacting hydrogen with components (a)-(c) are possible. In some embodiments, the procedure consists of dissolving a predetermined amount of hydrogen into the liquid hydrocarbon which is then used as medium for the contact of components (a)-(b) and optionally (c). In an alternative way, hydrogen is fed directly to the components (a)-(b) and optionally (c) are in contact through a hydrocarbon slurry.

In some embodiments, the solid catalyst component (a) is made from or contains a Ti compound supported on magnesium chloride.

In some embodiments, the titanium compounds have the formula $Ti(OR^{II})_n X_{y-n}$, wherein n is a number between 0 and 0.5 inclusive, y is the valence of titanium, $R^{II}$ is an alkyl, cycloalkyl or aryl radical having 1-8 carbon atoms and X is halogen. In some embodiments, $R^{II}$ is selected from the group consisting of ethyl, isopropyl, n-butyl, isobutyl, 2-ethylhexyl, n-octyl and phenyl, (benzyl). In some embodiments, X is chlorine.

In some embodiments, y is 4 and n varies from 0 to 0.02. In some embodiments, y is 3 and n varies from 0 to 0.015. In some embodiments, the titanium compound is $TiCl_4$.

In some embodiments, the solid catalyst component (A) is made from or contains an internal electron donor compound (internal donor), In some embodiments, the internal electron donor is selected from the group consisting of ethers, esters, amines and ketones. In some embodiments, the internal electron donor compound (ID) is used in amount to yield ID/Ti ratios from 0.1 to 8, alternatively from 0.5 to 7, alternatively from 1 to 6.

In some embodiments, the internal electron donor compounds are selected from the group consisting of esters of aliphatic or aromatic carboxylic acids, alkoxybenzenes, cyclic alkyl ethers, tetrahydrofuran and diethers. In some embodiments, the esters are selected from the group consisting of phthalates, acetates, and benzoates. In some embodiments, the acetate is ethylacetate. In some embodiments, the cyclic alkyl ethers is tetrahydrofuran. In some embodiments, the internal electron donor compounds are selected from the group consisting of ethyl acetate and tetrahydrofuran.

In some embodiments, the solid catalyst component (A) shows a porosity $P_F$ (deriving from pores with radius up to 1μ) determined with the mercury method ranging from 0.2 to 0.80 cm³/g, alternatively from 0.3 to 0.70 cm³/g, alternatively in the range 0.35-0.60 cm³/g.

In some embodiments, the surface area measured by the BET method is lower than 80. alternatively between 10 and 70 m²/g. In some embodiments, the porosity measured by the BET method is between 0.10 and 0.50, alternatively from 0.10 to 0.40 cm³/g.

In some embodiments, the particles of solid component have substantially spherical morphology and average diameter between 20 and 150 μm, alternatively from 40 to 100 μm. As used herein, the term "particles having substantially spherical morphology" refers to particles a ratio between the greater axis and the smaller axis equal to or lower than 1.5. alternatively lower than 1.3.

In some embodiments, preparation of the solid catalyst components includes a step (a) in which a compound $MgCl_2 \cdot mR^{III}OH$, wherein $0.3 \le m \le 1.7$ and $R^{III}$ is an alkyl, cycloalkyl or aryl radical having 1-12 carbon atoms is reacted with the titanium compound of the formula Ti(OR$^I$)$_n$X$_{4-n}$, in which n, y, X and R$^I$ have the same meaning as already defined.

In some embodiments, MgCl$_2$.mR$^{III}$OH represents a precursor of Mg dihalide. In some embodiments, these compounds are obtained by mixing alcohol and magnesium chloride in the presence of an inert hydrocarbon immiscible with the adduct, operating under stirring conditions at the melting temperature of the adduct (100-130° C.). The emulsion is quickly quenched, thereby causing the solidification of the adduct in form of spherical particles. In some embodiments, the spherical adducts are prepared as disclosed in U.S. Pat. Nos. 4,469,648, 4,399,054, or Patent Cooperation Treaty Publication No. WO98/44009. In some embodiments, the spherulization is achieved by the spray cooling disclosed in U.S. Pat. No. 5,100,849 or 4,829,034. In some embodiments, the adducts with a certain final alcohol content are obtained by using the selected amount of alcohol directly during the adduct preparation. In some embodiments, adducts with increased porosity are obtained by preparing adducts with more than 1.7 moles of alcohol per mole of MgCl$_2$ and then subjecting the adducts to a thermal and/or chemical dealcoholation process. The thermal dealcoholation process is carried out in nitrogen flow at temperatures between 50 and 150° C. until the alcohol content is reduced to the value ranging from 0.3 to 1.7. In some embodiments, the process is performed as disclosed in European Patent No. EP 395083.

In some embodiments, these dealcoholated adducts are characterized by a porosity (measured by mercury method) due to pores with radius up to 1 μm ranging from 0.15 to 2.5 cm$^3$/g, alternatively from 0.25 to 1.5 cm$^3$/g.

In the reaction of step (a) the molar ratio Ti/Mg is stoichiometric or higher. In some embodiments, the ratio is higher than 3. In some embodiments, a large excess of titanium compound is used. In some embodiments, the titanium compounds are titanium tetrahalides, alternatively TiCl$_4$. In some embodiments, the reaction with the Ti compound is carried out by suspending the adduct in cold TiCl$_4$. In some embodiments, the temperature of the TiCl$_4$ is 0° C. The mixture is heated up to 80-140° C. and maintained at this temperature for 0.5-8, alternatively from 0.5 to 3 hours. In some embodiments, the excess of titanium compound is separated at high temperatures by filtration or sedimentation and siphoning. In some embodiments, the step (a) is repeated twice or more. In some embodiments, an electron donor compound is added with the titanium compound in the reaction system for reaction with the MgCl$_2$.mR$^{III}$OH adduct.

In some embodiments, the internal electron donor compound is added separately in a further step after the completion of the reaction between the adduct and the titanium compound as disclosed in Patent Cooperation Treaty Publication No. WO2004/106388.

In some embodiments, before adding the internal electron donor, the solid catalyst component coming from the end of step (a) is subject to prepolymerization in the presence of aluminum alkyls, small amount of monomer and optionally an external donor as disclosed in Patent Cooperation Treaty Publication No. WO2014/202420.

In some embodiments, catalyst component (b) is selected from Al-alkyl compounds. In some embodiments, the aluminum-alkyl compounds are halogenated. In some embodiments, the aluminum-alkyl compounds are selected from the group consisting of Al-trialkyl compounds or dialkyl aluminum chlorides and mixtures thereof. In some embodiments, the Al-trialkyl compounds are selected from the group consisting of Al-trimethyl (TMA), Al-triethyl (TEA), Al-triisobutyl (TIBA) and Al-trihexyl (THA). In some embodiments, the dialkyl aluminum chloride is diethylaluminum chloride (DEAC). In some embodiments, the aluminum-alkyl compounds are mixtures among TIBA and DEAC. In some embodiments, the Al/Ti ratio is higher than 1, alternatively between 5 and 800.

In some embodiments, an external electron donor compound as a component (c) is present and selected from the group consisting of esters of aliphatic or aromatic carboxylic acids, cyclic alkyl ethers, tetrahydrofurandiethers, and alkoxysilanes. In some embodiments, the external electron donor compound is tetrahydrofuran. In some embodiments, the alkoxysilanes are substituted with alkyl or cycloalkyl groups.

In some embodiments, the catalyst system formed by the contact of components (a)-(b), optionally with (c), in the presence of hydrogen, is used directly in the main gas-phase polymerization process. In some embodiments, the catalyst system is pre-polymerized. In some embodiments, a pre-polymerization step is undertaken when a pre-polymerization has not occurred in the preparation of the solid catalyst component (a). In some embodiments, pre-polymerization is carried out with an olefin CH$_2$=CHR, where R is H or a C$_1$-C$_{10}$ hydrocarbon group. In some embodiments, ethylene, propylene or mixtures thereof are pre-polymerized with one or more α-olefins, wherein the mixtures contain up to 20% in moles of α-olefin and form amounts of polymer from about 0.1 g per gram of solid component up to about 1000 g per gram of solid catalyst component. In some embodiments, the pre-polymerization step is carried out at temperatures from 0 to 80° C., alternatively from 5 to 70° C., in the liquid or gas phase. In some embodiments, the pre-polymerization step is performed in-line as a part of a continuous polymerization process. In some embodiments, the pre-polymerization step is performed separately in a batch process.

In some embodiments, the gas-phase polymerization process is carried out at a temperature ranging from 60 to 130° C., alternatively from 70 to 110° C. In some embodiments, the total pressure of the gas-phase ranges from 10 to 40 bar, alternatively from 15 to 35 bars. In some embodiments, the fluidizing inert gas is an inert gas used in gas phase polymerization reactors. In some embodiments, the fluidizing inert gas is nitrogen or propane.

In some embodiments, the gas-phase process for the polymerization of olefins, includes the following steps in any order:
i) polymerizing ethylene, optionally together with one or more comonomers, in a gas-phase reactor in the presence of hydrogen and of a catalyst system made from or containing (a) a solid catalyst component made from or containing Ti, Mg, and Cl, and optionally an internal electron donor compound, (b) an aluminum alkyl compound and, optionally, (c) an external donor compound;
ii) copolymerizing ethylene, optionally with one or more comonomers, in another gas-phase reactor in the presence of an amount of hydrogen less than step i) and of the catalysts system as defined in step i);
where, in at least one of the gas-phase reactors, the growing polymer particles flow upward through a first polymerization zone (riser) under fast fluidization or transport conditions, leave the riser and enter a second polymerization zone (downcomer) through which the polymer particles flow downward under the action of gravity, leave the downcomer and are reintroduced into the riser, thereby establishing a circulation of polymer between the two polymerization zones. In the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In the second polymerization zone (downcomer), the polymer particles flow under the action of gravity in a densified form, thereby achieving high values of density of the solid (mass of polymer per volume of reactor) and approach the bulk density of the polymer. In other words, the polymer flows vertically down through the downcomer in a plug flow (packed flow mode), thereby small quantities of gas are entrained between the polymer particles.

In some embodiments, in step (ii) a copolymerization of ethylene with one or more comonomers is carried out.

When polymerizing ethylene, and optionally comonomers, in gas-phase, the amount of hydrogen used and the pressure ratio $H_2/C_2^-$ depends on the type of polyethylene to be produced. In some embodiments, the amount of hydrogen and the pressure ratio depend on the molecular weight expressed in terms Melt Flow Rate determined according to ASTM-D 1238 condition E. For relatively lower molecular weight (high values of MFR), the process uses a higher amount of hydrogen and higher pressure ratio $H_2/C_2$. In some embodiments, the pressure ratio ranges from 0.5 to 5, alternatively from 1 to 4, alternatively from 1.5 to 3.5.

In some embodiments, an activity enhancer is added in one or more of the polymerization steps. In some embodiments, the activity enhancer is selected from the group consisting of alkyl or cycloalkyl chlorides and halogenated alcohols. In some embodiments, the activity enhancer is in amounts to yield a molar ratio with Ti (where Ti is the titanium molar amount within component (a)), ranging from 0.1 to 10, alternatively from 0.5 to 8, alternatively from 0.5 to 6. In some embodiments, the activity enhancer compounds is selected from the group consisting of propyl chloride, isobutyl chloride, cyclohexyl chloride and 2,2,2-trichloro ethanol.

In some embodiments, additional ingredients are selected from the group consisting of antistatic, stabilizer, and fillers.

In some embodiments, the resulting polymers are selected from the group consisting of very-low-density and ultra-low-density polyethylene (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%; elastomeric copolymers of ethylene and propylene; and elastomeric terpolymers of ethylene and propylene with smaller proportions of a diene having a content by weight of units derived from ethylene of between about 30 and 70%.

The following examples are given in order to further describe the present disclosure in a non-limiting manner.

EXAMPLES

Characterizations

The properties are determined according to the following methods:
MIE flow index: ASTM-D 1238 condition E
Bulk density: DIN-53194

Examples 1-2 and Comparative 1

Procedure for the Preparation of the Solid Catalyst Component (A)

A magnesium chloride and alcohol adduct containing about 3 mols of alcohol was prepared following the method disclosed in Example 2 of U.S. Pat. No. 4,399,054, but working at 2000 RPM instead of 10000 RPM. The adduct were subject to a thermal treatment, under nitrogen stream, over a temperature range of 50-150° C. until a weight content of 25% of alcohol was reached.

Into a 2 L four-necked round flask, purged with nitrogen, 1 L of TiCl$_4$ was introduced at 0° C. At the same temperature, 70 g of a spherical MgCl$_2$/EtOH adduct containing 25% wt of ethanol were added under stirring. The temperature was raised to 140° C. in 2 h and maintained for 120 minutes. The stirring was discontinued. The solid product was allowed to settle. The supernatant liquid was siphoned off. The solid residue was then washed once with heptane at 80° C. and five times with hexane at 25° C. and dried under vacuum at 30° C.

Into a 260 cm$^3$ glass reactor with a stirrer, 351.5 cm$^3$ of hexane at 20° C. and, while stirring, 7 g of the catalyst component were introduced at 20° C. While maintaining the internal temperature, 5.6 cm$^3$ of tri-n-octylaluminum (TNOA) in hexane (about 370 g/l) and an amount of cyclohexylmethyl-dimethoxysilane (CMMS) to yield a molar ratio TNOA/CMMS of 50 were slowly introduced into the reactor. The temperature was brought to 10° C. After 10 minutes stirring, 10 g of propylene were introduced into the reactor at the same temperature during a time of 4 hours. The consumption of propylene in the reactor was monitored. The polymerization was discontinued when a theoretical conversion of 1 g of polymer per g of catalyst was reached. The content was filtered and washed three times with hexane at a temperature of 30° C. (50 g/l). After drying, the resulting pre-polymerized catalyst (A) was analyzed and found to contain 1.05 g of polypropylene per g of initial catalyst, 2.7% Ti, 8.94% Mg and 0.1% Al.

About 42 g of the solid pre-polymerized catalyst prepared by multiple runs were charged in a glass reactor purged with nitrogen and suspended in 0.8 L of hexane at 50° C.

Ethylene acetate was added dropwise (in 10') in such an amount to yield a molar ratio of 1.7 between Mg of the pre-polymerized catalyst and the organic Lewis base.

The slurry was kept under stirring for 2 h at 50° C.

The stirring was stopped. The solid was allowed to settle. One hexane wash was performed at room temperature before recovering and drying the final catalyst.

Example 1 Polymerization Procedure

The polymerization process was carried out in a plant working continuously and equipped with a stirred vessel (pre-contacting pot) in which the catalyst components were mixed to form the catalytic system, and a fluidized bed reactor (polymerization reactor) kept under fluidization conditions with propane receiving the catalyst mixture coming from the stirred vessel.

The following reactants were fed to the pre-contacting pot and maintained at a temperature of 50° C.:
the solid catalyst component (28 g/h)
liquid propane as diluent containing 100 ppm of $H_2$ (0.2 Kg/h)
a solution of TIBA/DEAC (140 Kg/h)
a solution of tetrahydrofuran (THF) as external donor (2 Kg/h)

The catalytic system was fed, via liquid propane containing 100 ppm of $H_2$ (at a rate of 0.2 Kg/h) from the pre-contacting section to the gas-phase fluidized bed reactor together with monomer feed. The reactor was operated under the conditions reported in Table 1. The polymer discharged from the final reactor was first transferred to the steaming section and then dried at 70° C. under a nitrogen flow and weighed. The polymer properties are reported in Table 1.

Example 2

The same procedure of Example 1 was followed with the difference that liquid propane containing 300 ppm of $H_2$ was used.

Comparative Example 1

The same procedure of Example 1 was followed with the difference that liquid propane not containing $H_2$ was used.

TABLE 1

| EXAMPLE | | 1 | 2 | C1 |
|---|---|---|---|---|
| T | °C. | 80 | 80 | 80 |
| P | bar | 26 | 26 | 26 |
| $C_2^-$ | % | 11.4 | 11.8 | 11.0 |
| $H_2/C_2^-$ | — | 2.5 | 2.5 | 2.5 |
| Spec. Mileage | g/g/bar · h | 492 | 483 | 397 |
| MIE | g/10' | 81 | 94 | 85 |
| PBD | g/cc | 0.430 | 0.434 | 0.434 |

What is claimed is:

1. A gas-phase process for the homopolymerization or copolymerization of olefins comprising the following steps:
    1) contacting, in a liquid hydrocarbon and in the absence of olefins, (a) a solid catalyst component comprising Ti, Mg, and Cl, and optionally an internal electron donor compound (ID), (b) an aluminum alkyl compound and optionally (c) an external donor compound; and
    2) feeding a product of the contacting step 1) to a gas-phase polymerization reactor under polymerization conditions, wherein the contacting step 1) is carried out in the presence of $H_2$ in an amount ranging from 0.1 to 8 g per kg of solid catalyst component (a).

2. The gas-phase process according to claim 1, wherein the amount of $H_2$ ranges between 0.2 to 6 g per kg of solid catalyst component (a).

3. The gas-phase process according to claim 1, wherein the contacting of the components (a)-(c) and hydrogen is carried out for a period of time ranging from 10 to 120 minutes.

4. The gas-phase process according to claim 1, wherein a temperature of the contacting step 1) ranges from 20 to 65° C.

5. The gas-phase process according to claim 1, wherein the liquid hydrocarbon is selected from aliphatic saturated hydrocarbons having from 3 to 10 carbon atoms.

6. The gas-phase process according to claim 1 wherein the liquid hydrocarbon medium contains a predetermined amount of hydrogen dissolved in the liquid hydrocarbon medium.

7. The gas-phase process according to claim 1, wherein the solid catalyst component (a) further comprises an internal electron donor compound (ID) selected from the group consisting of ethers, esters, amines and ketones.

8. The gas-phase process according to claim 7, wherein in which the ID is used in amount such as to yield an ID/Ti ratio from 0.1 to 8.

9. The gas-phase process according to claim 7, wherein the ID is selected from esters of aliphatic carboxylic acids.

10. The gas-phase process according to claim 1, wherein in step 1) the external donor compound is present as component (c) and is selected from the group consisting of esters of aliphatic or aromatic carboxylic acids, cyclic alkyl ethers and alkoxysilanes.

11. The gas-phase process according to claim 10, wherein the external donor is tetrahydrofuran.

12. The gas-phase process according to claim 1, wherein the aluminum alkyl compound (b) is selected from Al-triisobutyl/diethylaluminum chloride mixtures.

13. The gas-phase process according to claim 1, wherein step 2) is carried out at a temperature ranging from 60 to 130° C. and at total pressure of the gas-phase from 10 to 40 bar.

14. The gas-phase process according to claim 1, wherein step 2) comprises the following steps in any order:
    i) polymerizing ethylene, optionally together with one or more comonomers, in a gas-phase reactor in the presence of hydrogen and a catalyst system coming from step 1);
    ii) copolymerizing ethylene with one or more comonomers in another gas-phase reactor in the presence of an amount of hydrogen less than that of step i) and the catalyst system as defined in step i);
    where, in at least one of the gas-phase reactors, growing polymer particles flow upward through a first polymerization zone (riser) under fast fluidization or transport conditions, leave the riser and enter a second polymerization zone (downcomer) through which the polymer particles flow downward under the action of gravity, leave the downcomer and are reintroduced into the riser, thereby establishing a circulation of polymer between the two polymerization zones.

* * * * *

UNITED STATES PATENT AND TRADEMARK OFFICE
CERTIFICATE OF CORRECTION

PATENT NO. : 10,556,972 B2
APPLICATION NO. : 16/347124
DATED : February 11, 2020
INVENTOR(S) : Baita et al.

Page 1 of 1

It is certified that error appears in the above-identified patent and that said Letters Patent is hereby corrected as shown below:

On the Title Page

Column 1, Item (30), Line 1, delete "16197310" and insert -- 16197310.2 --, therefor Signed and Sealed this
Eighth Day of November, 2022

Katherine Kelly Vidal
*Director of the United States Patent and Trademark Office*